(12) United States Patent
Deore et al.

(10) Patent No.: US 8,325,413 B2
(45) Date of Patent: Dec. 4, 2012

(54) METHOD AND APPARATUS FOR CONTROLLING AN OUTPUT OF AN OPTICAL AMPLIFIER

(75) Inventors: Abhijeet D. Deore, Sunnyvale, CA (US); Andrew Q. Phan, San Jose, CA (US); Zhong Pan, Davis, CA (US)

(73) Assignee: Infinera Corporation, Sunnyvale, CA (US)

( * ) Notice: Subject to any disclaimer, the term of this patent is extended or adjusted under 35 U.S.C. 154(b) by 439 days.

(21) Appl. No.: 12/732,118

(22) Filed: Mar. 25, 2010

(65) Prior Publication Data

US 2011/0235164 A1 Sep. 29, 2011

(51) Int. Cl.
*H04B 10/17* (2006.01)
*H04B 10/12* (2006.01)

(52) U.S. Cl. ..................... 359/334; 359/341.3

(58) Field of Classification Search .................. 359/334, 359/341.3
See application file for complete search history.

(56) References Cited

U.S. PATENT DOCUMENTS

| 7,251,072 B2 * | 7/2007 | Ohtani et al. | 359/341.3 |
| 7,586,672 B2 * | 9/2009 | Ishikawa et al. | 359/334 |
| 2004/0042063 A1 * | 3/2004 | Ohtani et al. | 359/341.3 |

* cited by examiner

*Primary Examiner* — Eric Bolda
(74) *Attorney, Agent, or Firm* — David L. Soltz

(57) ABSTRACT

A system is provided that includes optical amplifiers provided upstream from an optical add-drop multiplexer (OADM). One of the optical amplifiers may be a Raman amplifier that supplies amplified light to another optical amplifier, such as an erbium doped fiber amplifier (EDFA), which, in turn, further amplifies and feeds the light to an input of the OADM. During turn-up, for example, the EDFA may initially be disabled, the power of the pump lasers of the Raman amplifier may be gradually increased until light input to the EDFA exceeds a power threshold at which the EDFA can amplify the input light. Light supplied to the EDFA does not have an excessive amount of power. Accordingly, at this point, the gain of the EDFA may be appropriately adjusted and then activated to supply optical signals to the OADM. Such optical signals may have a low power but not too low so as to prevent proper operation of downstream EDFA. Moreover, these optical signal do not have power that is so high as to cause "spiking." As a result, cross-talk with optical signals added by the OADM is minimized, and such added optical signals may be sufficiently amplified by optical amplifiers downstream from the OADM.

20 Claims, 4 Drawing Sheets

METHOD AND APPARATUS FOR CONTROLLING AN OUTPUT OF AN OPTICAL AMPLIFIER

BACKGROUND OF THE INVENTION

Wavelength division multiplexed (WDM) communication systems are known in which optical signals having different wavelengths are combined onto an optical path, including, for example, and optical fiber. Often, a so-called optical "add-drop multiplexer" (OADM) may be provided along the optical communication path, which demultiplexes or drops a sub-set of optical signals, while permitting other optical signals to continue propagating along the optical path (pass through optical signals). Other optical signals, which may have the same wavelength as those which were dropped may be or combined onto the optical path by the OADM, and such added signals may propagate along the optical path with the pass through optical signals.

Optical signals may suffer loss or attenuate during propagation along the optical path. Accordingly, one or more optical amplifiers, such as erbium-doped fiber amplifiers (EDFAs) and/or Raman amplifiers, may be provided along the optical path to boost or amplify the optical signals. In a WDM system including an OADM, the optical amplifiers may be provided upstream from the OADM to amplify optical signals input to the OADM, as well as downstream from the OADM, to amplify optical signals output from the OADM.

When a WDM system is installed or turned-up, certain optical signals may be added and/or dropped by an OADM, while optical amplifiers upstream from the OADM may not yet have been activated. In order to insure proper operation of the optical amplifiers, the optical signals applied thereto typically should have an adequate amount of optical power or exceed a threshold power. Below this threshold, the optical amplifier is unable to amplify an incoming optical signal. On the other hand, if pass through optical signals output from an optical amplifier upstream from an OADM have an excessive amount of optical power and are combined with optical signals added by the OADM, so-called "spiking" may occur, resulting in cross-talk between the pass through optical signal and the added optical signals, causing bit errors. Moreover, if such high power or "spiked" pass-through optical signals and the added optical signals are provided to an optical amplifier downstream from the OADM, the optical amplifier may allocate more gain to the pass through optical signals than to the added optical signals. The added optical signals, therefore, may not be amplified sufficiently, suffer excessive attenuation, and may not be adequately sensed at a receive end of the system.

A method and apparatus that eliminates or reduces "spiking," while assuring proper operation of the optical amplifier in a WDM system, is, therefore, desired.

SUMMARY

Consistent with the present disclosure, a method for use in a system having first and second optical amplifiers is provided. The system also includes an optical fiber is coupled to the first and second optical amplifiers, and a plurality of lasers coupled to the optical fiber and configured to supply pump light to the optical fiber to thereby impart a Raman gain in the optical fiber. The method includes activating the first optical amplifier to supply the first optical output to the optical fiber, and disabling the second optical amplifier, such that the second optical amplifier has substantially no light supplied therefrom. The method further includes increasing a pump power of the pump light from a minimum pump power to a threshold pump power at which a second optical output has a threshold power. The second optical output is supplied by the optical fiber in response to the pump light and is fed to an input of the second optical amplifier.

Consistent with an additional aspect of the present disclosure, an apparatus is provided that comprises a first optical amplifier, a second optical amplifier, and an optical fiber coupled to the first and second optical amplifiers. In addition, a plurality of lasers is coupled to the optical fiber and is configured to supply pump light to the optical fiber to thereby impart a Raman gain in the optical fiber. In addition, a processor circuit is provided that is configured to activate the first optical amplifier to supply the first optical output to the optical fiber and disable the second optical amplifier, such that the second optical amplifier has substantially no light supplied therefrom. Further, the processor circuit is configured to increase a pump power of the pump light from a minimum pump power to a threshold pump power at which a second optical output has a threshold power. The second optical output is supplied by the optical fiber in response to the pump light and is fed to an input of the second optical amplifier.

It is to be understood that both the foregoing general description and the following detailed description are exemplary and explanatory only and are not restrictive of the invention, as claimed.

The accompanying drawings, which are incorporated in and constitute a part of this specification, and together with the description, serve to explain the principles of the present disclosure.

DESCRIPTION OF THE EMBODIMENTS

Consistent with the present disclosure, a system is provided that includes optical amplifiers provided upstream from an optical add-drop multiplexer (OADM). One of the optical amplifiers may be a Raman amplifier or stage that supplies amplified light to another optical amplifier, such as an erbium doped fiber amplifier (EDFA), which, in turn, further amplifies and feeds the light to an input of the OADM. During turn-up, for example, the EDFA may initially be disabled, and the power of the pump lasers of the Raman amplifier may be gradually increased until light input to the EDFA exceeds a power threshold at which the EDFA can amplify the input light. Thus, light supplied to the EDFA does not have an excessive amount of power. Accordingly, at this point, the gains of the EDFA and the Raman stage may be optimally adjusted and then activated to supply optical signals to the OADM. Such optical signals may have a low power but not too low so as to prevent proper operation of a downstream EDFA. Moreover, these optical signals do not have a power level that is so high as to cause "spiking." As a result, cross-talk with optical signals added by the OADM is minimized, and such added optical signals may be sufficiently amplified by optical amplifiers downstream from the OADM.

Reference will now be made in detail to the present embodiments, examples of which are illustrated in the accompanying drawings. Wherever possible, the same reference numbers will be used throughout the drawings to refer to the same or like parts.

Figure 1:
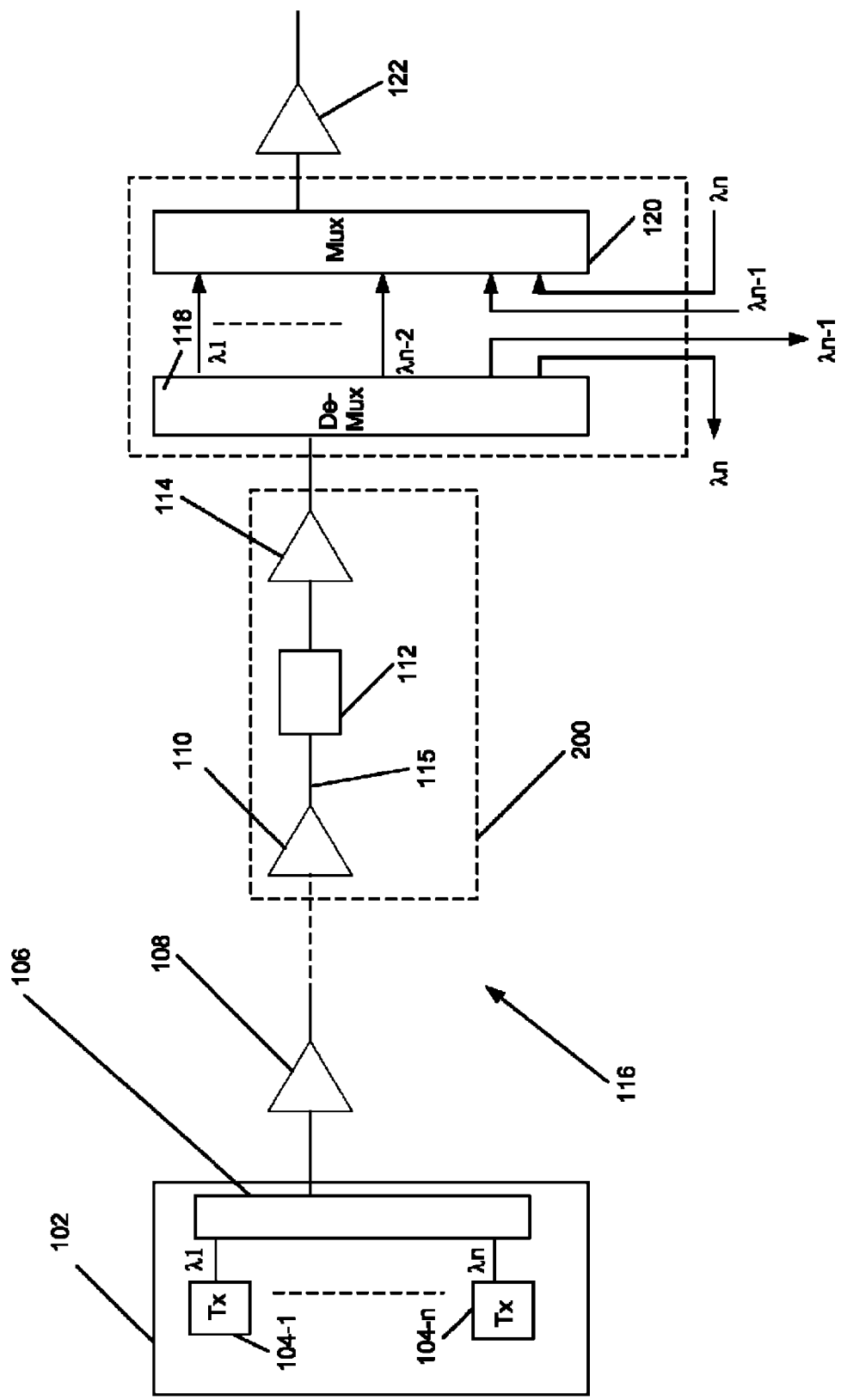
FIG. 1 illustrates a block diagram of a system consistent with the present disclosure.

FIG. 1 illustrates an optical communication system 100 consistent with an aspect of the present disclosure. System 100 includes a transmit node 102 which includes a plurality of optical transmitters 104-1 to 104-n, each of which outputting a corresponding of a plurality of optical signals. Each of the plurality of optical signals has a corresponding one of wavelengths $\lambda 1$ to $\lambda n$. A known optical combiner or multiplexer 106 is configured to receive and combine the optical signals into a WDM optical signal that is supplied on optical path 116. Optical path 116 includes optical amplifiers, such as EDFAs, three of which are shown as EDFAs 108 and 110, and 114. Optical path 116 also includes an optical fiber 115, and Raman amplifier or gain stage 112. It is understood, however, that other optical amplifiers in addition to or instead of those noted above may also be provided. For example, semiconductor optical amplifiers, or other doped fiber amplifiers may be provided in optical path 116.

The WDM optical signal is amplified by the amplifiers provided along optical path 116, such as EDFAs 108, 110, and 114, as well as Raman gain stage 112, noted above. In the example shown in FIG. 1, the output of EDFA 114 feeds the WDM optical signal to a known optical decombiner or demultiplexer 118 of OADM 119. Demultiplexer 118 may be configured to demultiplex or spatially separate, for example, the optical signals that constitute the WDM signal.

As shown in FIG. 1, selected ones of the optical signals may be dropped, such as optical signals having wavelengths $\lambda n-1$ and $\lambda n$, while remaining optical signals $\lambda 1$ to $\lambda n-2$ are passed through to multiplexer 120. Moreover, added optical signals having wavelengths $\lambda n-1$ and $\lambda n$ may be supplied to multiplexer 120, which combines these optical signals with the passed through optical signals having wavelengths $\lambda 1$ to $\lambda n-2$ onto optical communication path 116 and onto EDFA 122.

Figure 2A:
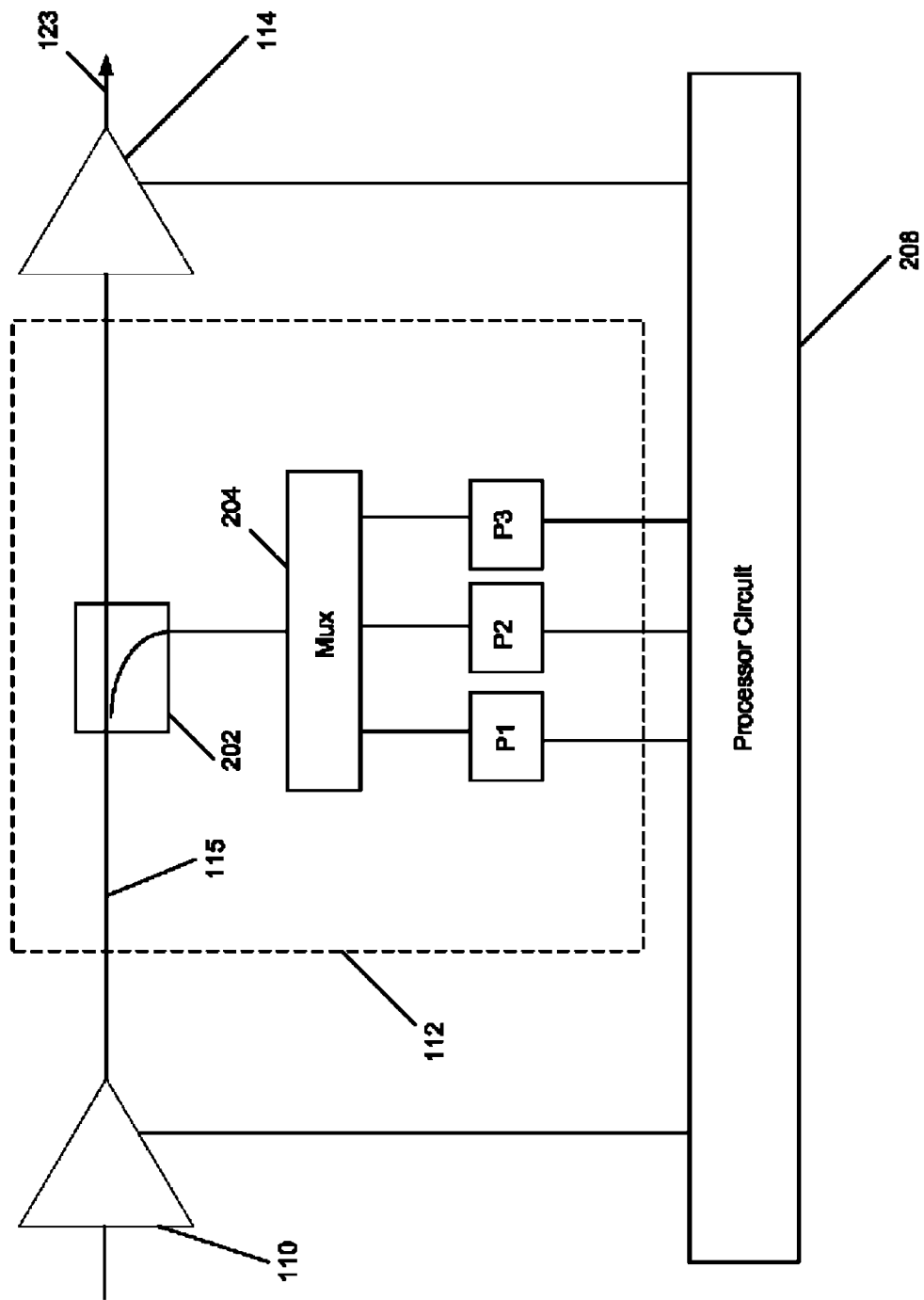
FIG. 2a illustrates a portion of the system shown in FIG. 1 including several amplifiers.

FIG. 2a shows portion 200 of system 100 in greater detail. System portion 200 includes EDFAs 110, 114, as well as Raman stage 112. Raman stage 112 includes Raman pump lasers or pump lasers P1 to P3, for example, which supply pump light at a given pump power to multiplexer 204. Multiplexer 204, in turn, combines the outputs of pump lasers P1 to P3 and supplies the combined output to a coupler 202, for example. The pump light from pump lasers P1 to P3 is then directed onto fiber 115 in such a way as to counter-propagate in fiber 115 relative the propagation direction (as represented by arrow 123) of the WDM signal. The pump light output from pump lasers P1 to P3 may have wavelengths selected so as to provide Raman gain in optical fiber 115 in a known manner. Although three pump lasers P1 to P3 are shown in FIG. 2a, it is understood that any appropriate number of pump lasers may be provided in Raman stage 112.

Figure 2B:
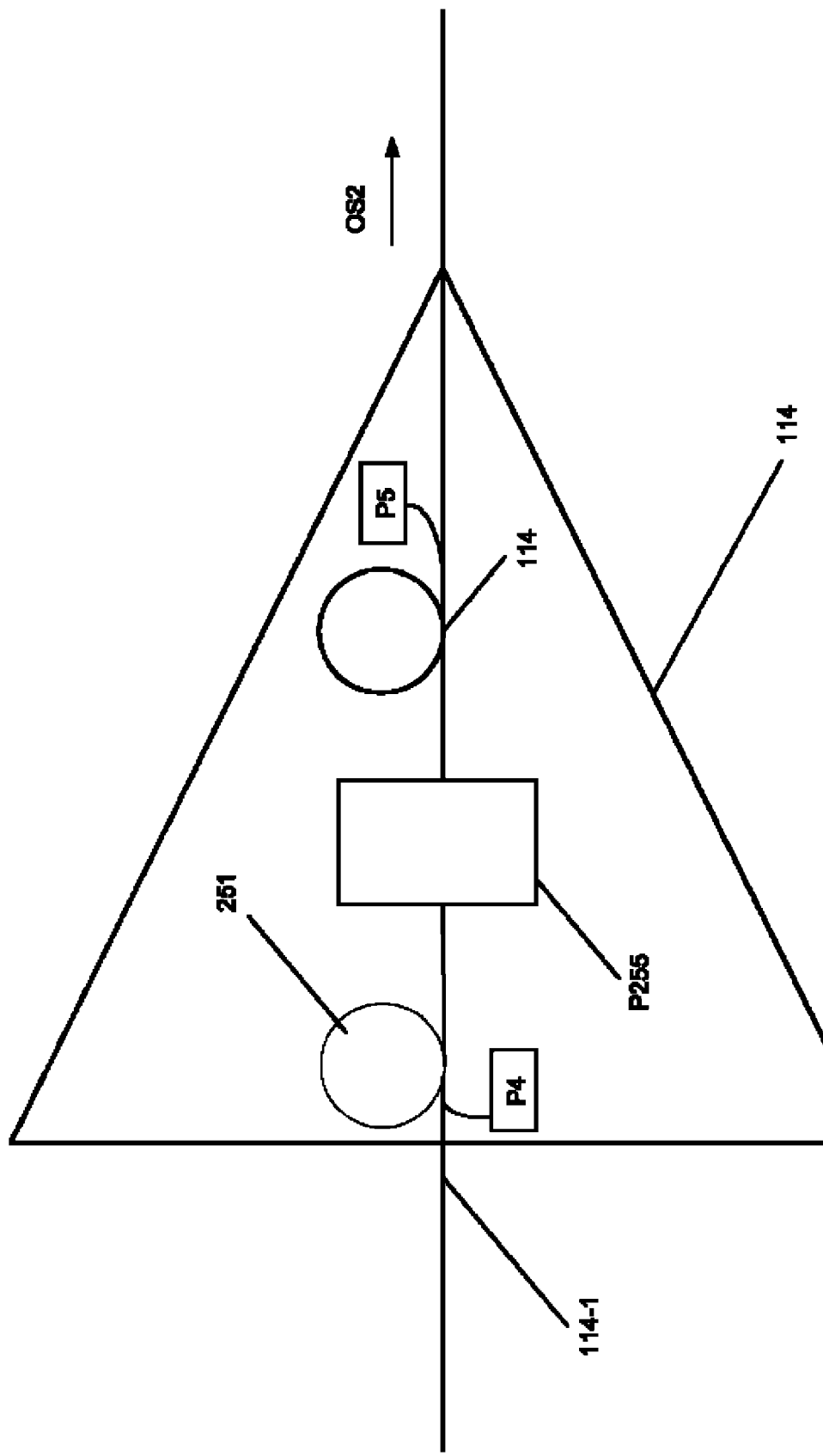
FIG. 2b illustrates an example of an optical amplifier consistent with an additional aspect of the present disclosure.

FIG. 2b illustrates an exemplary EDFA (e.g., EDFA 114) in greater detail. EDFA 114 may includes first (251) and second (253) sections of erbium doped optical fiber, and an intermediate stage 255, including a filter or dispersion compensating fiber (DCF), coupled therebetween. Pump lasers P4 and P5 supply pump light to erbium doped fiber sections 251 and 253, respectively. The pump light supplied by pump laser P4 may have a wavelength substantially equal to 980 nm, for example, and the pump light supplied by pump laser P5 may have a wavelength substantially equal to 1480 nm, for example. Although two pump lasers P4 and P5 are shown in FIG. 2b, it is understood that any appropriate number of pump lasers may be provided in EDFA 114. EDFA 114 may have an input that receives the optical signal input on optical fiber 115. In addition, EDFA 114 may output optical signal OS2, which is an amplified version of the input optical signal. Optical signal OS2 is discussed in greater detail below.

Returning to FIG. 2a, during normal operation, processor circuit 208 supplies control signals to pump lasers P1 to P3 of Raman stage 112, as well as pump lasers in EDFAs 110 and 114 to control the gain imparted by each of these amplifiers. It is understood, that processor circuit 208 may include a single microprocessor or multiple microprocessors or computers that may be distributed and not co-located in one place. Moreover, processor circuit 208 may include circuitry, which may be provided in or associated with each optical amplifier to control, by application of appropriate voltage or current to the pump lasers of each amplifier, the power or intensity of the pump light generated in each optical amplifier. Various parts or portions of processor circuit 208 may communicate with one another over an optical service channel carried either in-band or out of band over optical path 116 in a known manner.

Figure 3:
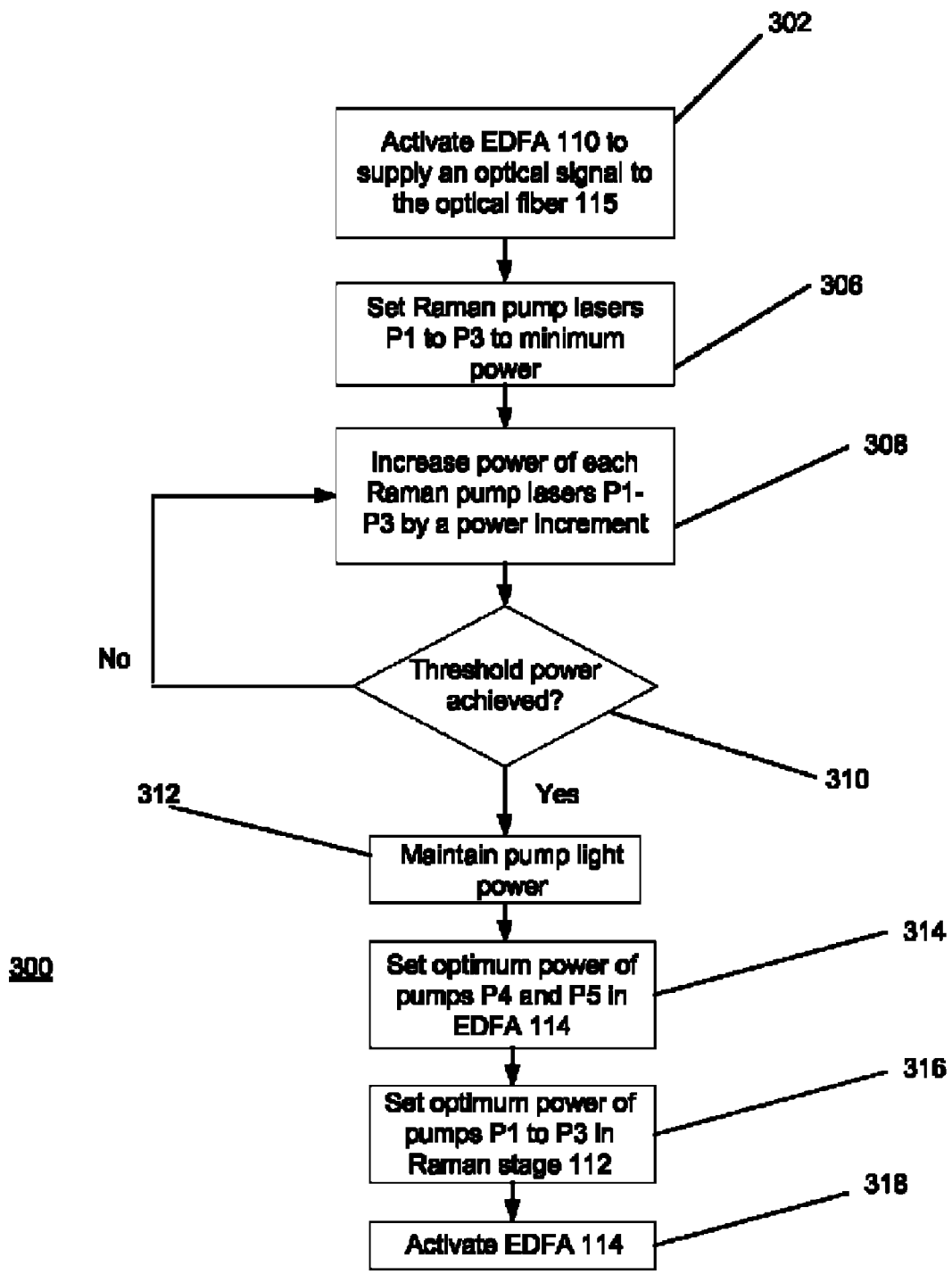
FIG. 3 illustrates a flow chart of a method consistent with an additional aspect of the present disclosure.

However, during a start-up mode, for example, processor circuit 208 may successively activate each optical amplifier between Raman stage 112 and node 102 (see FIG. 1) beginning with that optical amplifier along optical path 116 that is closest to transmit node 102. In the example shown in FIG. 1, the amplifier closest to node 102 is EDFA 108. A detailed example of a start-up mode will next be described with reference to FIGS. 1, 2a, and 3. FIG. 3 illustrates a flow chart 300 of a method consistent with an additional aspect of the present disclosure.

Initially, all optical amplifiers along optical path 116 are disable. For example, pump lasers P4 and P5 in EDFA 114, are turned off by processor circuit 208 and thus EDFA 114 is disabled, such that no light is supplied therefrom. Processor circuit 208 (see FIG. 2a) then activates EDFA 108 as well as remaining optical amplifiers provided along path 116 by supplying an appropriate current or voltage to thereby drive the pump lasers in each amplifier to output pump light with a desired power level. Accordingly, EDFA 110 is activated and supplies an optical signal to optical fiber 115 (step 302 in FIG. 3).

In step 306, each of pump lasers P1 to P3 is driven at a minimum power level by processor circuit 208 so that the pump light power output therefrom is at a minimum (step 306). The pump light power supplied from pump lasers P1 to P3 may then be increased. In one example, the pump light power is increased in uniform steps or increments (step 308), such as 1 db. In an alternative example, the pump light power is increased in non-uniform steps. In yet another example, each increment occurs after a delay following a preceding increment. In addition, the pump power may be increased continuously.

As noted above, the pump light imparts Raman gain in optical fiber 115. As a result, the optical signal output from EDFA 110 may be amplified, and with each increment of pump light power, the intensity or power of the optical signal increases accordingly. The optical signal, however, is fed as an input to EDFA 114. Thus, the optical signal should have a power level high enough, such that EDFA 110, when activated, can adequately amplify the optical signal and generate a further optical signal (OS2) that is output along optical path 116 to add/drop multiplexer 119. On the other hand, as noted above, the optical signal power should not be too high so as to cause spiking. Accordingly, the pump light power is increased, either continuously or in steps, until the optical signal output from EDFA 110 exceeds a threshold power level, which corresponds to a threshold pump light power level. At the optical signal threshold power, spiking is avoided, while EDFA 114 can operate properly.

Processor circuit 208 determines, through a sensor (not shown) provided at input 114-1 of EDFA 114, whether the optical output from EDFA 110 is at or above the threshold power, and, if it is not, the pump light power is increased by another increment (step 310), and processor circuit 208 will continue to increase the pump power until the optical signal threshold power, and thus the threshold pump power, are achieved. Accordingly, once the optical output has increased such that it is at or above the threshold power, the pump light power is maintained at that level (step 312).

Next, optimum power of pump lasers P4 and P5 of EDFA 114 may be determined so that the optical output of EDFA 114 is at a desired power level (step 314). In particular, processor circuit 208 may then determine a predetermined output power of EDFA 114, such that amplifier 114 supplies a further optical signal OS2, corresponding to an amplified version of the optical signal input to amplifier 114, at an appropriate power level that avoids spiking when such optical signal passes through OADM 119. Processor circuit 208 may then control pump lasers P4 and P5 in EDFA 114 to supply pump light power to fibers 251 and 253, respectively, which then provide sufficient gain to the incoming optical signal from optical fiber 115 and output optical signal OS2 at the desired power level. EDFAs 108 and 110 may have a structure similar to that of EDFA 114 shown in FIG. 2*b*.

Returning to FIG. 3, the power of pumps P1 to P3 of Raman stage 112 may also be optimized so that the optical power at input 114-1 of EDFA 114 is at a preferred level (step 316). EDFA 114 may then be activated by powering up pump lasers P4 and P5 to the optimum pump power (step 318).

Optical signal OS2, including signals having one or more of wavelengths $\lambda 1$ to $\lambda n$-2 may be supplied to OADM 119 where it is passed through along optical path 116 to EDFA 122. In one example, optical signal OS2 may be combined with added optical signals, such as those having wavelengths $\lambda n$-1 and $\lambda n$, onto optical path 116 by multiplexer 120 of add/drop multiplexer 119 (see FIG. 1). Since OS2 is at a desired power level, cross-talk with the added optical signals and spiking may be reduced. In addition, when amplified by EDFA 122, each of the pass through optical signals (e.g., OS2) or channels as well as the added optical signals may be amplified by substantially the same amount, such that each has substantially the same or uniform gain.

As noted above, pump light supplied from pump lasers P1 to P3 may be increased until the optical output from amplifier 110 has a threshold power level. If after a predetermined number of successive increases in pump light power, the threshold is not achieved, an alarm may be generated to indicate either a break in fiber 115, for example, or other fault along optical path 116 or within Raman gain block 112, for example.

Other embodiments will be apparent to those skilled in the art from consideration of the specification and practice of the present disclosure. It is intended that the specification and examples be considered as exemplary only, with a true scope and spirit of the invention being indicated by the following claims.

What is claimed is:

1. A method for use in an optical system having first and second optical amplifiers, an optical fiber coupled to the first and second optical amplifiers, and a plurality of lasers coupled to the optical fiber, the method comprising:

activating the first optical amplifier to supply an optical signal to the optical fiber;

disabling the second optical amplifier, such that the second optical amplifier has substantially no light supplied therefrom; and increasing a pump power of the pump light from a minimum pump power to a threshold pump power to impart a Raman gain in the optical fiber such that the optical signal has a threshold power, the optical signal being fed to an input of the second optical amplifier.

2. A method in accordance with claim 1, wherein the plurality of lasers is a first plurality of lasers, the pump light is a first pump light, the second optical amplifier has a second plurality of lasers, and the optical signal is a first optical signal, the method further including:

determining a predetermined output power of the second optical amplifier; and activating the second plurality of lasers to supply second pump light, such that the second optical amplifier supplies a second optical signal having the predetermined output power.

3. A method in accordance with claim 1, wherein the first optical amplifier includes an erbium-doped fiber amplifier.

4. A method in accordance with claim 1, wherein the second optical amplifier includes an erbium-doped fiber amplifier.

5. A method in accordance with claim 1, wherein said increasing the pump power includes increasing the pump power in power increments.

6. A method in accordance with claim 5, wherein each of the power increments is substantially equal to 1 db.

7. A method in accordance with claim 1, wherein said increasing the pump power includes increasing the pump power in substantially uniform power increments.

8. A method in accordance with claim 1, wherein said increasing the pump power includes increasing the pump power in unequal power increments.

9. A method in accordance with claim 2, further including:

supplying the second optical signal to an add/drop multiplexer;

combining the second optical signal with a third optical signal with the add/drop multiplexer, the second optical signal having a wavelength which is different than a wavelength of the third optical signal.

10. A method in accordance with claim 5, wherein successive ones of the pump increments are delayed relative to one another.

11. An apparatus, comprising:

a first optical amplifier;

a second optical amplifier;

an optical fiber coupled to the first and second optical amplifiers;

a plurality of lasers coupled to the optical fiber and being configured to supply pump light to the optical fiber; and a processor circuit configured to:

activate the first optical amplifier to supply an optical signal to the optical fiber;

disable the second optical amplifier, such that the second optical amplifier has substantially no light supplied therefrom; and increase a pump power of the pump light from a minimum pump power to a threshold pump power to thereby impart a Raman gain in the optical fiber such that the optical signal has a threshold power, the optical signal being fed to an input of the second optical amplifier.

12. An apparatus in accordance with claim 11, wherein the plurality of lasers is a first plurality of lasers, and the pump light is a first pump light, the optical signal is a first optical signal, the apparatus further including:
  a second plurality of lasers provided in the second optical amplifier,
    wherein the processor circuit is further configured to:
    determine a predetermined output power of the second optical amplifier; and
    activate the second plurality of lasers to supply second pump light, such that the second optical amplifier supplies a second optical signal having the predetermined output power.

13. An apparatus in accordance with claim 11, wherein the first optical amplifier includes an erbium-doped fiber amplifier.

14. An apparatus in accordance with claim 11, wherein the second optical amplifier includes an erbium-doped fiber amplifier.

15. An apparatus in accordance with claim 11, wherein the processor circuit is configured to increase the pump power in power increments.

16. An apparatus in accordance with claim 15, wherein each of the power increments is substantially equal to 1 db.

17. An apparatus in accordance with claim 11, wherein the processor circuit is configured to increase the pump power in substantially uniform power increments.

18. An apparatus in accordance with claim 11, wherein the processor circuit is configured to increase the pump power in unequal power increments.

19. An apparatus in accordance with claim 11, further including:
  an optical path; and
  an optical multiplexer configured to receive the second optical signal and a third optical signal and combine the second and third optical signals onto the optical path, the second optical signal having a wavelength different than that of the third optical signal.

20. An apparatus in accordance with claim 15, wherein successive ones of the power increments are delayed relative to one another.

* * * * *